(12) United States Patent
Dudziak et al.

(10) Patent No.: US 7,966,027 B1
(45) Date of Patent: Jun. 21, 2011

(54) USING AN SMPP PARAMETER FOR MANAGING MESSAGE CONTENT WITHIN A WIRELESS NETWORK

(75) Inventors: Thaddeus Jude Dudziak, Pleasanton, CA (US); Sergei Karpov, Concord, CA (US)

(73) Assignee: Cellco Partnership, Basking Ridge, NJ (US)

( * ) Notice: Subject to any disclaimer, the term of this patent is extended or adjusted under 35 U.S.C. 154(b) by 997 days.

(21) Appl. No.: 11/878,837

(22) Filed: Jul. 27, 2007

(51) Int. Cl.
*H04W 4/00* (2009.01)

(52) U.S. Cl. ......................................... 455/466; 725/25

(58) Field of Classification Search .......... 455/405–406, 455/466, 414.1, 428; 709/206–207, 219
See application file for complete search history.

(56) References Cited

U.S. PATENT DOCUMENTS

| | | | |
|---|---|---|---|
| 7,155,243 B2 | 12/2006 | Baldwin et al. | |
| 7,437,772 B1 * | 10/2008 | Thenthiruperai et al. | 726/30 |
| 7,720,463 B2 | 5/2010 | Marsico | |
| 2005/0065884 A1 | 3/2005 | Dumont et al. | |
| 2005/0278620 A1 | 12/2005 | Baldwin et al. | |
| 2006/0013191 A1 | 1/2006 | Kavanagh | |
| 2006/0256012 A1 | 11/2006 | Fok et al. | |
| 2007/0026878 A1 * | 2/2007 | Midkiff et al. | 455/466 |
| 2007/0260603 A1 | 11/2007 | Tuscano et al. | |
| 2008/0009268 A1 | 1/2008 | Ramer et al. | |
| 2008/0096605 A1 | 4/2008 | Gissin et al. | |
| 2008/0114884 A1 | 5/2008 | Hewes et al. | |
| 2008/0139112 A1 | 6/2008 | Sampath et al. | |
| 2008/0153468 A1 | 6/2008 | Reilly | |

OTHER PUBLICATIONS

U.S. Appl. No. 11/798,804, filed May 17, 2007, by Zhang, et al., entitled "Multimedia messaging service content filtering".
Federal Communication Commission (FCC), "V-Chip: Viewing Television Responsibly", last updated Jul. 8, 2003, retrieved from: http://www.fcc.gov/vchip/ on Jun. 13, 2007.

* cited by examiner

*Primary Examiner* — Rafael Pérez-Gutiérrez
*Assistant Examiner* — Marcos Batista
(74) *Attorney, Agent, or Firm* — McDermott Will & Emery LLP

(57) ABSTRACT

A Short Message Peer-to-Peer (SMPP) parameter is used for managing message content of a message within a wireless communication network, such as an SMS message. A content rating is associated with a short code corresponding to the content and the content rating is inserted, for example, into a Tag Length Variable (TLV) field of the message. The content rating can be compared with a subscriber rating to determine whether to block or approve delivery of a message based upon the comparison.

10 Claims, 6 Drawing Sheets

FIGURE 3  APPROVE submit_sm PDU – Hexadecimal Representation (98 bytes)

```
00000000:  00 00 00 62 00 00 00 04 00 00 00 00 00 02 8C 85  ...b............
00000010:  00 00 00 31 31 38 30 31 32 32 32 32 33 30 30 00  ...11801222230 0.
00000020:  00 00 32 31 33 36 30 35 39 39 36 37 00 00 00 00  ..2136059967....
00000030:  00 00 01 00 00 00 1E 54 65 73 74 20 77 69 74 68  .......Test with
00000040:  20 63 6F 6E 74 65 6E 74 20 72 61 74 69 6E 67 20   content rating
00000050:  6F 66 20 34 30 14 01 00 04 00 00 15 B3 14 04 00  of 40...........
00000060:  00 28                                            :(
```

FIGURE 4 submit_sm PDU – Decoded representation

SMPP Header:
  Command Length = 98 bytes (0x62)
  Command Id = submit_sm = 0x04
  Command Status = 0x0
  Sequence Number = 0x28C85

SMPP Body:
  Source Address:
    TON = 0x0
    NPI = 0x0
    Value = 11801222222300
  Destination Address:
    TON = 0x0
    NPI = 0x0
    Value = 2136059967
  ESM Class = 0:0:0
  Registered Delivery = 0:0:1
  Billing Id = 0x15B3
  Data Coding = 0x0
  SM Length = 0x1E
  Short Message = "Test with content rating of 40"
  Payload Length = 0x0
  Payload
  Content Rating = 40 (0x28)

FIGURE 5 submit_sm_resp PDU – Hexadecimal Representation (25 bytes)

```
00000000:  00 00 00 19 80 00 00 04 00 00 00 00 00 02 8C 85:  ........
00000010:  36 66 30 39 64 31 31 35 00                     :  6f09d115.
``` submit_sm_resp PDU – Decoded representation

SMPP Header:
Command Length = 25 (0x19)
Command Id = submit_sm_resp = (0x80000004)
Command Status = 0 (0x0)
Sequence Number = 167045 (0x28C85)

SMPP Body:
Message Id = 6f09d115 (0x36663039643131 35)

FIGURE 6

USING AN SMPP PARAMETER FOR MANAGING MESSAGE CONTENT WITHIN A WIRELESS NETWORK

TECHNICAL FIELD

The present subject matter relates to equipment and processes for using a Short Message Peer-to-Peer (SMPP) parameter for managing message content within a wireless communication network.

BACKGROUND

In recent years, mobile wireless communications have become increasingly popular. Initial implementations of mobile wireless communications, for example in the form of cellular telephone networks, supported circuit switched voice communication services. The carriers developed short message service (SMS) technology to provide text and/or e-mail communications via the wireless communication networks.

The SMS service, for example, provides text messages for display on the mobile devices. In a typical implementation, SMS communications to/from a mobile station (such as a cellular telephone, or a Personal Digital Assistant (PDA) or similar device) use a signaling channel over the airlink and use out-of-band signaling resources of the mobile phone network for transport to/from a server platform referred to as an MC (Message Center), also known as an SMSC (Short Message Service Center). The MC, for example, receives packet communications containing text messages and forwards the messages via the signaling resources and the signaling channels to the appropriate mobile stations. The MC will also receive similar messages from the mobile devices and forward them to servers or terminal devices accessible via an Internet Protocol (IP) packet data network. For example, the MC may forward an SMS message to an External Short Messaging Entity (ESME), also known as a Value Added Service (VAS) provider. The MC may also supply SMS message content to a mobile station from an ESME.

At present, a mobile station user may send an SMS message request to an External Short Messaging Entity (ESME) requesting a response such as, for example, a "joke of the day," or basketball scores, or a stock price quote. As another example, the message may be a vote for a candidate in a television program. "Short codes" (also known as "campaigns") may be used to identify specific applications and request specific services. Short codes are typically 3 to 6 digits long. A single ESME may have multiple simultaneous short codes for different services, such as basketball scores and baseball scores. For example, a user may send an SMS message request to a short code such as "12345." The "upstream" message may be a blank SMS message (containing no information in the body of the message). This SMS message request includes a header with information indicating "from" the particular mobile station, and indicating "to" the short code. The wireless communications network forwards the SMS message request to the appropriate ESME. The ESME may respond with an appropriate SMS message response containing, for example, the desired joke or other information, or the ESME may record a vote. This SMS message response includes a header with information indicating "from" the short code, and indicating "to" the mobile station. The ESME may charge for this value added service. Services which require additional payments (either per month, or per use) are typically known as premium services.

Both the request and the response travel through a Short Message Peer-to-Peer (SMPP) gateway. Current SMPP parameters (in version 3.4 of SMPP protocols) facilitate message handling, but do not consider or rate the message content. In other words, there is no parameter in the SMPP protocols that is presently designated for evaluating or rating the contents of the message.

Recently, the Federal Communications Commission (FCC) has adopted rules requiring all television sets with picture screens 33 centimeters (13 inches) or larger to be equipped with features to block the display of television programming based upon its rating. This technology is known as the "V-Chip." The V-Chip reads information (a content rating) encoded in the rated program and blocks programs from the set based upon the rating (a subscriber rating) selected by the parent. This V-Chip system requires special hardware in the television, and is limited to televisions. There is a possibility that in the near future the FCC may require wireless communication networks to provide some similar type of ratings and blocking options for various mobile services including SMS premium services. Further, there may be customer demand for content management options for SMS premium services.

Also recently, some wireless communication networks may attempt to limit access by challenging the user, for example by asking the user how old the user is. These conventional approaches have severe limitations: the V-Chip requires extra hardware and is limited to television, and challenging a user is limited by the honesty of the user.

Actually searching the body of the message for inappropriate words (an "intelligent" filter) is not desirable due to the huge volume of messages and the need to process the messages very quickly. Further, "intelligent" filters tend to yield many false positives (for example, the word "breast" in an article about breast cancer may cause the filter to block the message) and tend to yield many false negatives (for example, a very sexual joke may consist solely of words that are harmless individually, and may be approved by the filter). Thus, it is very difficult to individually evaluate the content of individual messages.

Hence, as a result of the limitations of existing hardware and existing methods, a need exits for a method to manage the contents of SMS messages without requiring additional hardware in the mobile station. Specifically, a need exists for a method that has one or more of the following features: a) does not require additional hardware in the mobile station, b) uses existing wireless communication network hardware, c) does not substantially delay the flow of SMS messages, d) facilitates accounting of which messages are blocked and which messages are approved, e) associates a content rating with a short code, f) compares the content rating to a subscriber rating and blocks or approves an SMS message based upon the comparison, and g) does not require the wireless communications network to analyze (word search) the body of each message.

SUMMARY

The teachings herein alleviate one or more of the above noted problems with conventional approaches to managing message content and provide beneficial results by addressing one or more of the above discussed needs regarding management of SMS message content.

In one example, a parameter is defined using SMPP protocol version 3.4. The parameter allows the content of an SMS message to be rated by an ESME, or rated by a wireless service provider, or by both. Analysis of the rating can determine how to process the SMS message.

Hence, a first exemplary method and a second exemplary method manage message content within a wireless network using short message service protocols.

The first exemplary method involves receiving a first short message, from a mobile station to an External Short Messaging Entity, via a Mobile Switching Center and a Messaging Center and a Short Message Peer-to-Peer Gateway. The first short message includes a short code and an identification of the mobile station. The short code is associated with a service provided by the External Short Messaging Entity. In response to the first short message, the External Short Messaging Entity sends a second short message to the Short Message Peer-to-Peer Gateway. The second short message includes the short code, the identification of the mobile station, and additional information associated with the service provided by the External Short Messaging Entity. The second short message is sent from the Short Message Peer-to-Peer Gateway to the Messaging Center. At this stage, the second short message sent from the Short Message Peer-to-Peer Gateway includes the short code, the identification of the mobile station, and a content rating. A subscriber rating associated with the mobile station identification is determined and compared with the content rating. Based upon the comparison of the subscriber rating with the content rating, a decision is made whether to block delivery of the second short message to the mobile station, or to approve delivery of the second short message to the mobile station, or to perform some other action.

A second exemplary method involves receiving a first short message, from a mobile station. The first short message includes a short code, and an identification of the mobile station. After receiving the first short message, the first short message is sent to an External Short Messaging Entity via a Short Message Peer-to-Peer Gateway. A second short message is received from the External Short Messaging Entity. The second short message includes the short code, a content rating associated with the short code, and the mobile station identification. Then a subscriber rating associated with the mobile station identification is determined. The determined subscriber rating is compared with the content rating. Based upon the comparison of the subscriber rating with the content rating, a decision is made whether to block delivery of the second short message to the mobile station, or to approve delivery of the second short message to the mobile station, or to perform some other action.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The figures depict one or more implementations in accord with the present teachings, by way of example only, not by way of limitation. In the figures, like reference numerals refer to the same or similar elements. Acknowledgements and other signaling and handshaking transmissions are generally not shown for the sake of brevity and clarity.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details.

In other instances, well known methods, procedures, components, and circuitry have been described at a relatively high-level, without detail, in order to avoid unnecessarily obscuring aspects of the present teachings.

Figure 1:
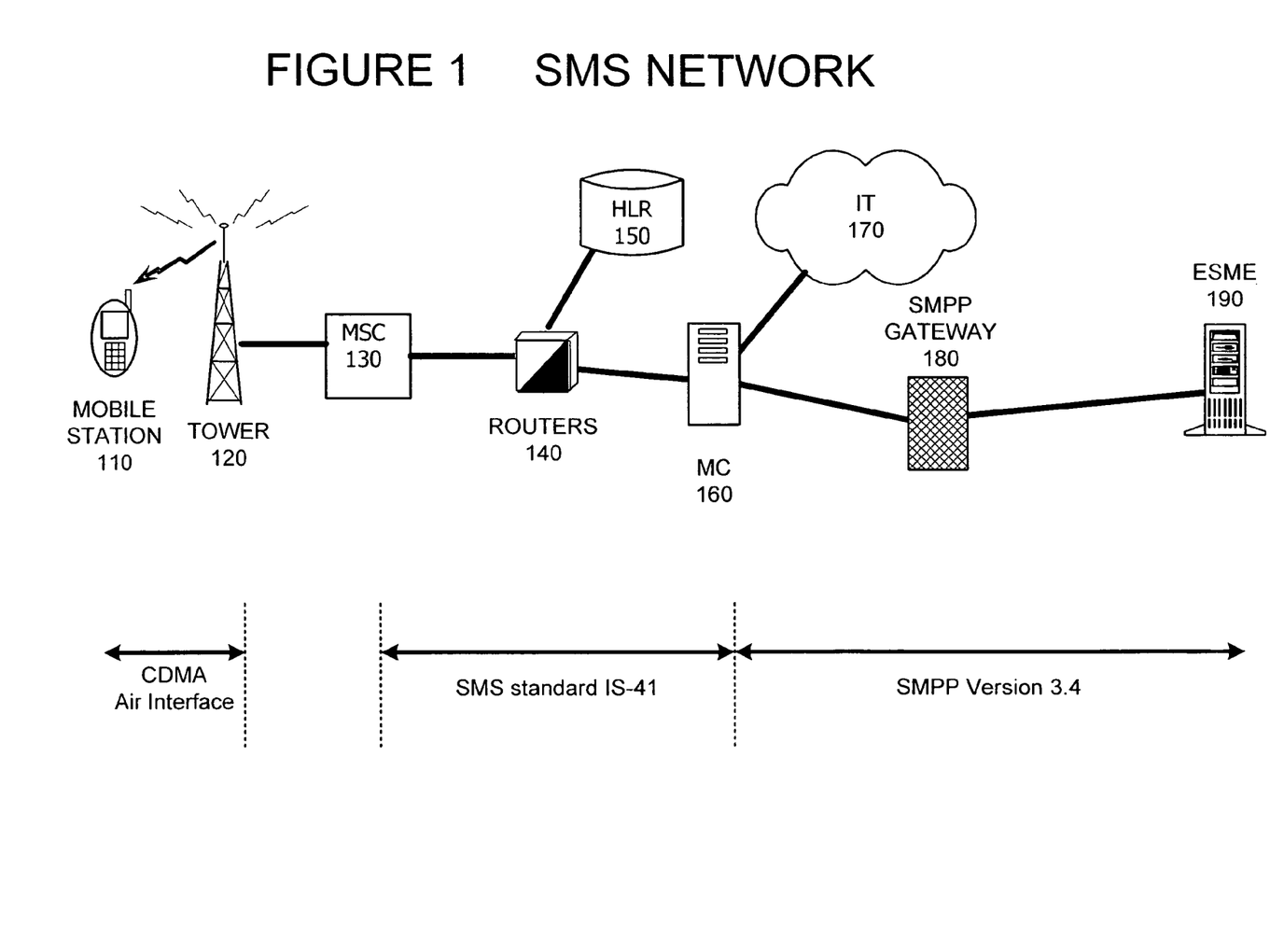
FIG. 1 illustrates an example of a wireless communication network adapted to manage the message content of SMS messages.

FIG. 1 illustrates an example of a wireless communication network adapted to manage the message content of SMS messages. The major elements of this network will be discussed from left to right: Mobile Station (MS) 110, Base Station (BS) cell site Tower 120, Mobile Switching Center (MSC) 130, Router 140, Home Location Register (HLR) 150, Message Center (MC) 160, Information Technology (IT) networks/systems 170, Short Message Peer-to-Peer (SMPP) Gateway 180, and External Short Messaging Entities (ESME) 190.

The term "message" will be used throughout this application in a broad sense, including messages that contain characters or other forms of user content in the body of the message, and including "blank messages" that do not contain any information in the body of the message. Concepts illustrated by SMS communications may also apply to Multi-Media Service (MMS) communications and to other types of message communications.

The term "mobile station" will be used throughout this application in a broad sense, including wireless communication devices such as: a cellular telephone, or a Personal Digital Assistant (PDA), or a car navigation device mounted in a car, or a personal computer with wireless communications mounted in a home, or similar. In other words, "mobile station" refers to any device capable of communicating using a wireless communication network, and the device does not have to be physically mobile.

The communication paths are generally bidirectional. Some exemplary communication standards are indicated at the bottom of FIG. 1. Communications to the left of Tower 120 may use other wireless standards, but the example uses Code Division Multiple Access (CDMA) air interface standards. Additionally, GSM (Global System for Mobile communications) is the most popular standard for mobile phones in the world, may also be used as an air interface standard. Communications between MSC 130 and Router 140 and MC 160 may use SMS standard IS-41. Communications between MC 160 and SMPP Gateway 180 and ESME 190 may use SMPP standard version 3.4 over an Internet Protocol (IP) network (not shown).

Mobile Station 110 may be a user's cellular telephone, and communicates with the base station equipment associated with the cellular Tower 120. Exemplary mobile stations include various wireless communication devices such as: a cellular telephone, or a Personal Digital Assistant (PDA), or a car navigation device mounted in a car, or personal computer mounted in a home, or similar. A user may type in a short code such as "12345" (similar to typing in a telephone number) and then hit the send button on Mobile Station 110. The body of the message may be empty, or may contain a text message such as "SUBSCRIBE" or "YES" or "NO." Thus, MS 110 may send an SMS message request directed to ESME 190. This message will contain the short code in the "to" portion of the address field of the header, and will contain an identification number of the mobile station (such as the telephone number) in the "from" portion of the address field of the header.

Each mobile station has an associated subscriber mobile directory number (MDN), and a valid device number (MIN or IMSI)

An SMS message includes source and destination address fields. For messages from a mobile station, the source address is the MDN of the sending mobile station. The destination address may be a MDN of a destination station or some other form of recognizable address. Of note for purposes of this discussion of content management, one type of alternative address is a short code, typically four, five, six, eight, or twelve digits. The network routes a SMS message with a MDN destination address all the way through to the addressed mobile station. The network routes a SMS message with a short code destination address to a service provider application (such as ESME 190) corresponding to the short code. Depending on the service, the wireless communication network may process the message, e.g. to count votes; or may translate the short code to a destination address, e.g. an IP address of an external customer's server, such as the ESME server of a value added service provider.

SMS routing thus allows use of short codes as a mechanism to route messages to/from a service provider, as opposed to communication of messages between end user devices. For this purpose, the short code is recognized by a control application as being a message to a service provider as opposed to a message between SMS user devices, and the control application translates the short code to direct the message to the appropriate service provider platform.

For an outgoing SMS message from a mobile station, the message includes a source address comprising a field for a normal telephone number and a field for another device identifier assigned by the network operator. In a typical SMS communication from a mobile station, the telephone number is the MDN whereas the other identifier is a MIN or IMSI.

For SMS messages originating at a mobile station, the MSC 130 determines where to route the message, typically to one of several MCs 160 deployed in the network. The MSC makes that determination based on the MIN of the sending device. Essentially, the MSC looks up the point code or other form of address for the appropriate MC based on the MIN of the sending mobile station 110 contained in the received SMS message.

Mobile Station 110 and the base station equipment associated with cellular Tower 120 typically operate in the microwave band of radio frequencies, and the modern trend is towards digital encoding of the information in the communication. Cellular Tower 120 receives an SMS message request from MS 110 and, in turn the base station equipment forwards the SMS message request to MSC 130.

MSC 130 is a Mobile Switching Center, also known as a Mobile Telephone Switching Office (MTSO). An MSC houses the field monitoring and relay stations for switching voice calls between the cellular and wire-based (land-line) central office. The MSC also conducts various signaling communications with mobile stations and with other switching centers or offices. The signaling resources also carry SMS message traffic.

Routers are interfaces which connect networks. Router 140 connects MSC 130, and HLR 150, and MC 160. Routers are self-learning, and can dynamically adapt to changes in network conditions. A router may use SS7 protocols, also known as Signaling System 7, or Signaling System Seven.

HLR 150 is a Home Location Register which is a database storing subscriber features and settings, and has a pointer telling which cell Mobile Station 110 is located in. In other words, the pointer identifies the current network location of the Mobile Station 110. The subscriber features stored in HLR 150 may include a subscriber rating used for managing message content, or the subscriber rating may be stored in IT 170. As recognized in the art, an HLR stores for each mobile subscriber station the subscriber's mobile directory number (MDN), the MIN, and information specifying the wireless services subscribed to by the mobile subscriber, such as voice service features, SMS, mobile web access, etc. One aspect of normal HLR processing of an incoming voice or SMS call involves translation of the MDN associated with the call into the MIN, for use in completing the call to the mobile station 21. For each mobile station, the HLR also stores data identifying the current point of attachment of the mobile station to the network.

MC 160 is a Message Center which allows short text messages to be exchanged between mobile telephones and other networks. MC 160 stores and forwards Short Message Service (SMS) messages.

The MC may compare a content rating with a short code and determine whether to block or to approve a message. This comparison and determination may be made using a SMS message request from MS 110, or made using a SMS message response directed to the MS.

In one example, MC 160 may determine whether to block the message or approve a SMS message request by comparing a content rating (associated with a short code in the SMS message request) with a subscriber rating associated with MS 110. This comparison and determination may be made directly upon the SMS request message, before forwarding to ESME 190. This procedure may be described as "request blocking" by the MC.

In another example, however, it is preferable for MC 160 to forward the SMS message request from Mobile Station 110 without determining a content rating, without comparing the content rating with the subscriber rating, and without determining whether to block or approve the SMS message request based on the comparison. In other words, it is preferable for MC 160 to wait for an SMS message response from the ESME 190 containing a content rating before making a comparison for the following, reasons. This procedure may be described as "response blocking" by the MC. First, waiting for a response allows the request to directly reach the ESME 190 without delay or blocking, and there are some procedural and accounting advantages of allowing ESME 190 to at least receive requests before any blocking occurs. Second, waiting for a response containing a content rating allows MC 160 to shift the task and burden of determining a content rating to either ESME 190 or to Gateway 180. Gateway 180 and ESME 190 are discussed in detail below.

MC 160, in turn, communicates with IT 170 and SMPP Gateway 180.

IT 170 is an Information Technology computer or group of computers which store subscriber features and settings such as a subscriber rating for use in content managing of messages. IT 170 may also serve accounting and billing functions by recording data associated with each transmission, manipulating the data, and forwarding the data to appropriate parties continuously or periodically.

SMPP Gateway 180 is a Short Message Peer-to-Peer (SMPP) gateway used to connect the wireless communication network (such as an Internal Protocol IP network on the left of the Gateway) to another network (such as a public Internet network on the right of the Gateway). SMPP Gateway 180 allows the MC 160 to receive and send messages in IP packet format. The SMPP Gateway 180 is an entity within the wireless network that acts as an intermediary between the wireless service provider network and the external application server network. For example, the SMPP Gateway 180 converts messages in protocol(s) used by ESME applications, e.g. Extensible Markup Language (XML), Hypertext Mail Protocol (HTMP), etc., to and from the SMPP protocol. The SMPP messages ride on IP transport, e.g. between the SMPP Gateway 180 and the MC 160.

In the example, the message format protocol called SMPP version 3.4 is used for the communications between an SMPP Gateway 180 and ESME 190, without conversion, for convenience. SMPP Gateway 180 communicates with ESME 190. SMPP Gateway 180 may have geographically redundant configuration utilizing two gateways at two distinct geographical locations (not shown), wherein a first gateway is able to perform all of the functions of a second gateway if the first gateway fails, and vice versa. This geographical redundancy is good practice for providing highly reliable service, but is not essential for this application.

ESME 190 is one or more External Short Messaging Entities (ESME) or Value Added Service (VAS) providers. ESME 190, for example, may receive an SMS message from Mobile Station 110 requesting a response such as a "joke of the day," or basketball scores, or a stock price quote. Alternatively the message may be a vote for a candidate in a television program. Of course, the ESME 190 may offer any of a wide array of other services utilizing the SMS communication with the Mobile Station 110.

ESME 190 may respond to a request by sending an SMS message to Mobile Station 110. The message from ESME 190 may initially include a content rating, and/or a content rating may be added later by SMPP Gateway 180. The content rating added by SMPP Gateway 180 may overwrite the content rating earlier provided by ESME 190. Alternatively, a content rating may be associated with the message by MC 160. It is preferable, although not essential, that ESME 190 and/or SMPP Gateway 180 include at least one content rating with the SMS message response in order to reduce the workload of MC 160.

The content ratings and subscriber ratings may be identical to the six V-Chip ratings used for television: TV-Y (All Children—This program is designed to be appropriate for all children.); or TV-Y7 (Directed to Older Children—This program is designed for children age 7 and above); or TV-G (General Audience—Most parents would find this program suitable for all ages); or TV-PG (Parental Guidance Suggested—This program contains material that parents may find unsuitable for younger children); or TV-14 (Parents Strongly Cautioned—This program contains some material that many parents would find unsuitable for children under 14 years of age); or TV-MA (Mature Audience Only—This program is specifically designed to be viewed by adults and therefore may be unsuitable for children under 17).

Also, the content ratings and subscriber ratings may be identical to the five ratings used for motion pictures by the Motion Picture Association of America (MPAA): G, PG, PG-13, R, and NC-17. Implicitly, the V-Chip and MPAA ratings each include an additional category which is "unrated." Numbers may be used instead of letters to represent the content ratings and the subscriber ratings (for example, G=1, PG=2, PG-13=3, R=4, and NC-17=5), and an additional number may be used to represent unrated content, or unrated content may be treated as equivalent to NC-17. Using numbers facilitates mathematical comparisons by microprocessors between a content rating and a subscriber rating. For example, if the subscriber rating is equal or greater than the content rating, then the message may be approved. Alternatively, if the subscriber rating is less than the content rating, then the message is blocked. A subscriber rating of 0 (or any other convenient number) may indicate that the subscriber has not opted into the content managing service, and may serve as a default setting.

Additionally, the content ratings may be any subscriber rating system imposed by a wireless network, such as: Youth, Teen, Mature, and Adult. Interestingly, the V-Chip and the MPAA ratings operate under the basic assumption that a mature audience receives greater privileges. A "reverse" ratings system may be adapted to keep mature audiences out of certain premium services such as chat rooms designed for teenagers, or a high school student telephone directory. For example, a "reverse" G content rating may block subscribers with subscriber ratings such as NC-17.

Further, the wireless network may impose an initial default subscriber rating upon a user who has not yet actively chosen a subscriber rating (for example, a new user). For example, a new user may receive a minimum subscriber rating (such as TV-Y or G) until the user changes the subscriber rating to a different subscriber rating. Alternatively, a wireless network may impose different default ratings upon different types of new users. For example, a first mobile station of a family plan may be designated as a primary mobile station (typically for a parent) and receive an initial maximum subscriber rating (such as TV-MA or NC-17) by default. Any additional mobile stations for the family plan may be designated as secondary (or servant) mobile stations and receive an initial minimum subscriber rating (such as TV-Y or G) by default. The subscriber rating of the additional mobile stations may only be changed by using the primary mobile station, and/or may only be changed by using some password given to the purchaser of the family plan. The primary mobile station may be notified of any change in the subscriber rating of a secondary mobile station. A subscriber that does not participate in this content management service may receive a subscriber rating of "unrated."

Figure 2:
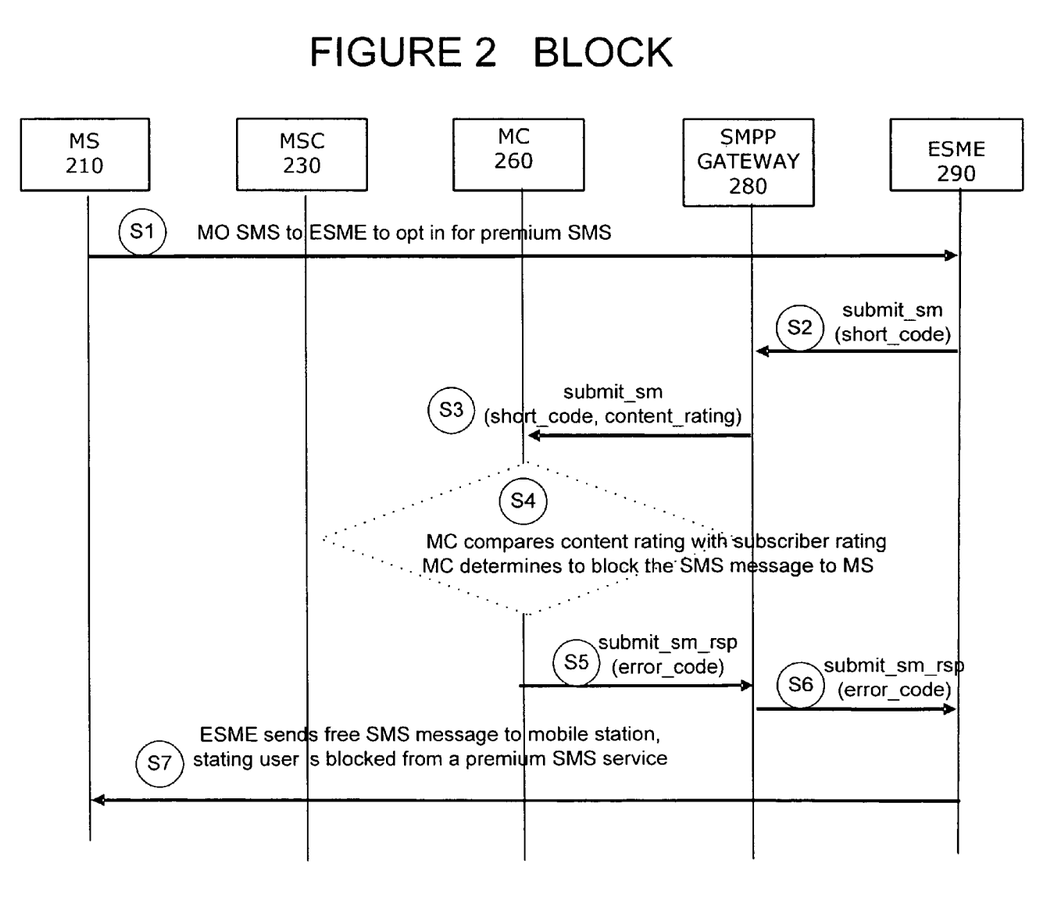
FIG. 2 illustrates an example of attaching a content rating to an SMS message by an SMPP Gateway, comparing the content rating to a subscriber rating by a Message Center (MC), and determining to block the message by the MC.

FIG. 2 illustrates an example of attaching a content rating to a response message by an SMPP Gateway, comparing the content rating to a subscriber rating by an MC, and determining to block the message by the MC.

Step S1. Mobile Station 210 sends a mobile originated (MO) SMS message request to ESME 290 to opt in for a premium SMS service. For example, the subscriber sends an empty SMS message to short code 12345 requesting a joke of the day, or perhaps voting for a candidate on a television show. The wireless network (including MSC 230, MC 260, and SMPP Gateway 280) forwards the request message to ESME 290 based on the short code according to standard protocols. The request also includes an identification of the Mobile Station 210, typically its MDN.

Step S2. ESME 290 receives the SMS message request from MS 210, and sends an SMS message response intended for MS 210. This response uses SMPP standard Version 3.4 and includes the short code (for example, the short code may be in the address "from" field of the header, and a telephone number of MS 210 may be in the address "to" field of the header), and may also include a content rating associated with the short code. SMPP standard Version 3.4 defines Tag Length Variables (TLV) with multiple fields outside of the body of the message. For example, one field is labeled "1404" in hexadecimal, and ESME 290 may insert the content rating in this field. This field is not in the body of the message, and the body of the message is not affected by a content rating inserted into this field.

Step S3. SMPP Gateway 280 receives the SMS message response from ESME 290, and may insert or attach a content rating associated with the short code. For example, SMPP Gateway 280 may use a lookup table to lookup the short code in the response and to select an associated content rating. In one example, only the Gateway inserts a content rating into the response, for example into field "1404" where the field is specified in hexadecimal. It is possible that all short codes associated with a specific ESME may have the same associated content rating.

There are many possible procedures for inserting a content rating, such as: a) only the Gateway inserts a content rating into the response, for example into field "1404" as discussed above; or b) only the ESME inserts a content rating into the response; or c) the ESME inserts a first content rating and then the Gateway inserts a second content rating which overwrites the first content rating (for example in field "1404," this procedure inserts a content rating as long as either the ESME or the Gateway is successful); or d) the ESME inserts a first content rating into a first field and the Gateway inserts a second content rating into a second field that does not overwrite the first content rating (this provides two content ratings which may not be identical, and a decision to block or allow may be based upon the most restrictive content rating, or based on the least restrictive content rating, or based preferentially upon the ESME content rating if it is present, or based preferentially upon the Gateway content rating if it is present); or e) neither the ESME nor the Gateway may provide a content rating (this requires the MC 260 to do additional work, that is, to use a lookup table to lookup the short code in the response and to select an associated content rating), or f) the Gateway may insert a default content rating if the ESME failed to insert a content rating into the response, or g) the Gateway may insert a default content rating if the ESME failed to insert a short code in the response, or h) the Gateway may insert a content rating of "unrated" if no other content rating can be determined (for example, if no content rating is present in the response from the ESME, and no content rating is available in the lookup table for the short code in the response from the ESME.)

Additionally, SMPP Gateway 280 may use a single procedure at all times, or may be adapted to select among different procedures depending upon the circumstances.

A specific example of a message in step S3 is provided in FIG. 4 and FIG. 5, and is discussed below with reference to FIG. 4 and FIG. 5.

Step S4. MC 260 receives the SMS message response from SMPP Gateway 280 comprising the short code and preferably also comprising a content rating associated with the short code. Optionally, MC 260 can use a lookup table to associate a content rating with the short code. The SMS message response is addressed to an identification number (typically a phone number) associated with MS 210. MC 260 may use IT 170 (not shown) to lookup or associate a subscriber rating with the identification number.

MC 260 compares the content rating with the subscriber rating. For example, the content rating may be R (restricted) and the subscriber rating may be G (general). In this example, MC 260 determines to block the SMS response message.

Generally a wireless network strives to deliver messages, and not delivering a message is considered a failure (bad). However, in this example blocking an SMS response message with a content rating that is not appropriate for the subscriber rating is considered a success (a good block). A parent may wish to receive information regarding good blocks on a child's mobile telephone, and may agree to be billed for each good block. There are many potential billing schemes for a content managing service, including one or more the following: free, monthly recurring charge (MRC), one time setup charge, charge per comparison, charge per block, or charge per approval. Further, note that the ESME may wish to paid for every response, but may only be paid for responses that are approved and delivered. IT 170 (not shown in FIG. 2) may handle this accounting and billing information.

Step S5. After MC 260 determines to block, an "error" SMS message (or blocking message) may be sent to SMPP Gateway 280.

An example of an error SMS message in step S5 is provided in FIG. 6, and is discussed below with reference to FIG. 6.

Step S6. SMPP Gateway 280 forwards this "error" SMS message to ESME 290. This message notifies the ESME that the response message was blocked. The text of the "error" SMS message may contain: information identifying the blocked response message, and/or the word "BLOCKED," and/or an error code such as "765432" indicating that the message was blocked, and/or contain blocking details such as the content rating and the subscriber rating that were used to make the comparison.

Step S7. ESME 290 (or MC 260) may send a (possibly free) SMS message to MS 210 stating that the user has been blocked from receiving a response from a premium SMS service due to a comparison of the subscriber rating and the content rating. ESME 290 may take this opportunity to offer SMS services that will not be blocked, based on the subscriber rating which was included in the "error" SMS message. For example, ESME 290 may offer a youth joke of the day service which will not be blocked, in place of an adult joke of the day service which was blocked. ESME 290 may also include a sample youth joke of the day. Similarly, but not shown, MC 260 may send another (possibly free) SMS message to MS 210 giving instructions for changing the subscriber rating, if so desired.

Figure 3:
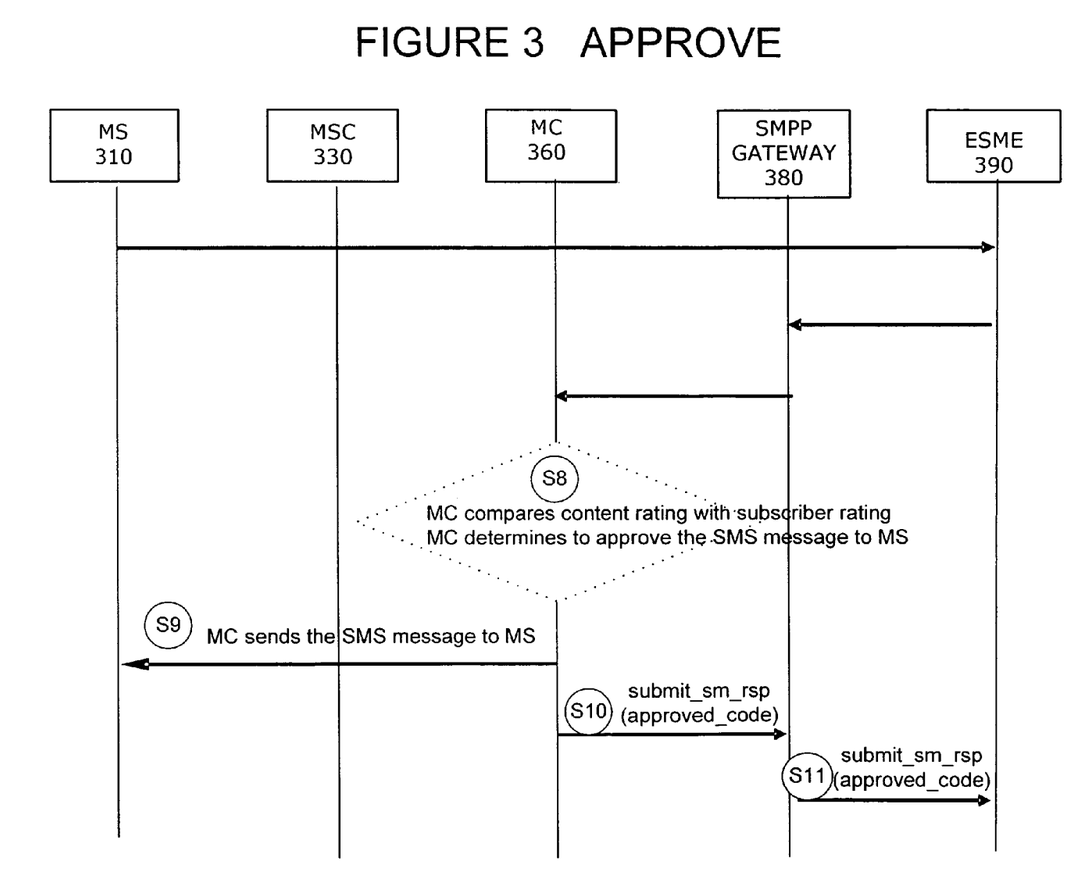
FIG. 3 illustrates an example similar to FIG. 2, except that a determination is made to approve the message by the (MC), instead of blocking the SMS message.

FIG. 3 illustrates an example similar to FIG. 2, except that a determination is made to approve the SMS response message. The top three arrows in FIG. 3 are identical to the top three arrows in FIG. 2, and do not need further discussion.

Step S8. MC 360 compares the content rating with the subscriber rating, and determines to approve the SMS message response.

Step S9. Since the content rating for this message passes the comparison test, the MC 360 sends the SMS message response to MS 310 using normal SMS message delivery procedures.

Step S10. MC 360 sends an approval SMS message to SMPP Gateway 380 indicating that the SMS message response was approved, and possibly containing additional information such as the subscriber rating.

Step S11. SMPP Gateway 380 forwards the approval SMS message to ESME 390, possibly containing additional information such as the subscriber rating. The ESME may send advertising messages to MS 360 which are appropriate for the subscriber rating. For example, the ESME may examine subscriber records and determine that that a subscriber rating has been recently increased from G to R, and therefore this subscriber is effectively a potential new customer for a range of services with a content rating of R. This type of information is valuable for generating increased revenues for both the ESME and for the wireless communication network provider.

Figure 4:
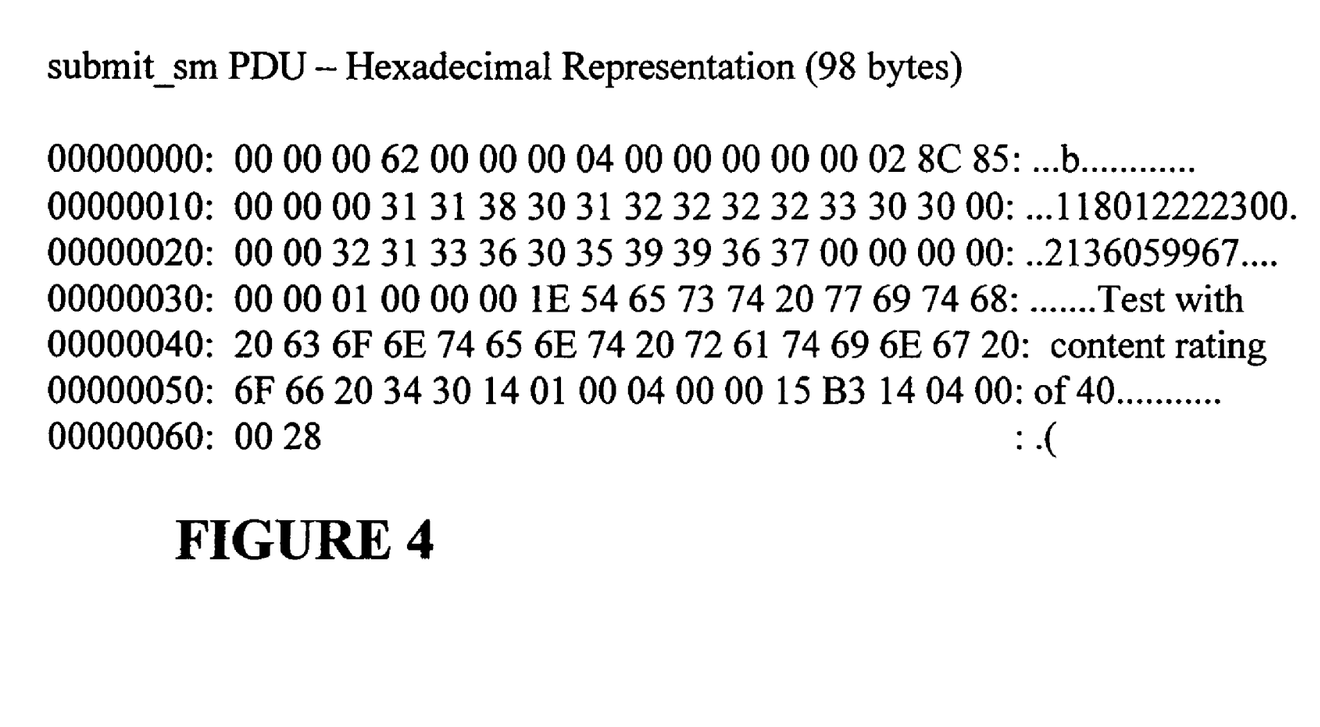
FIG. 4 illustrates an example of a message containing a content rating, in hexadecimal representation.

FIG. 4 illustrates an example of a message containing a content rating, in hexadecimal representation. This exemplary message may contain a content rating, and may be sent during step S3 in FIG. 2 from SMPP Gateway 280 to MC 260.

This message may be a Protocol Data Unit (PDU), which is Open Systems Interconnection (OSI) terminology for a generic "packet." A PDU is a message of a given protocol comprising payload and protocol-specific control information, typically contained in a header. PDUs pass over the protocol interfaces which exist between the layers of protocols (per OSI model). A PDU is a data object exchanged by protocol machines (entities) within a given layer. PDUs consist of both data and control (Protocol) information that allows the two entities to coordinate their interactions.

This message is a hexadecimal representation of a message from Step S3. The content rating is "28" in hexadecimal, which equals 40 in ordinary decimal notation. The content rating of "28" in hexadecimal is shown on the last line of the hexadecimal representation. Note that (2 times 16) plus (8 times 1) equals 40. The exemplary location of the content rating is in the vender defined TLV (Tag Length Variable) "1404" in hexadecimal.

Programmers often use special notation to identify hexadecimal representations. For example, 0x28 is interpreted as "28" in hexadecimal. Thus, the PDU of FIG. 4 illustrates a content rating of 0x28 in TLV 0x1404.

Figure 5:
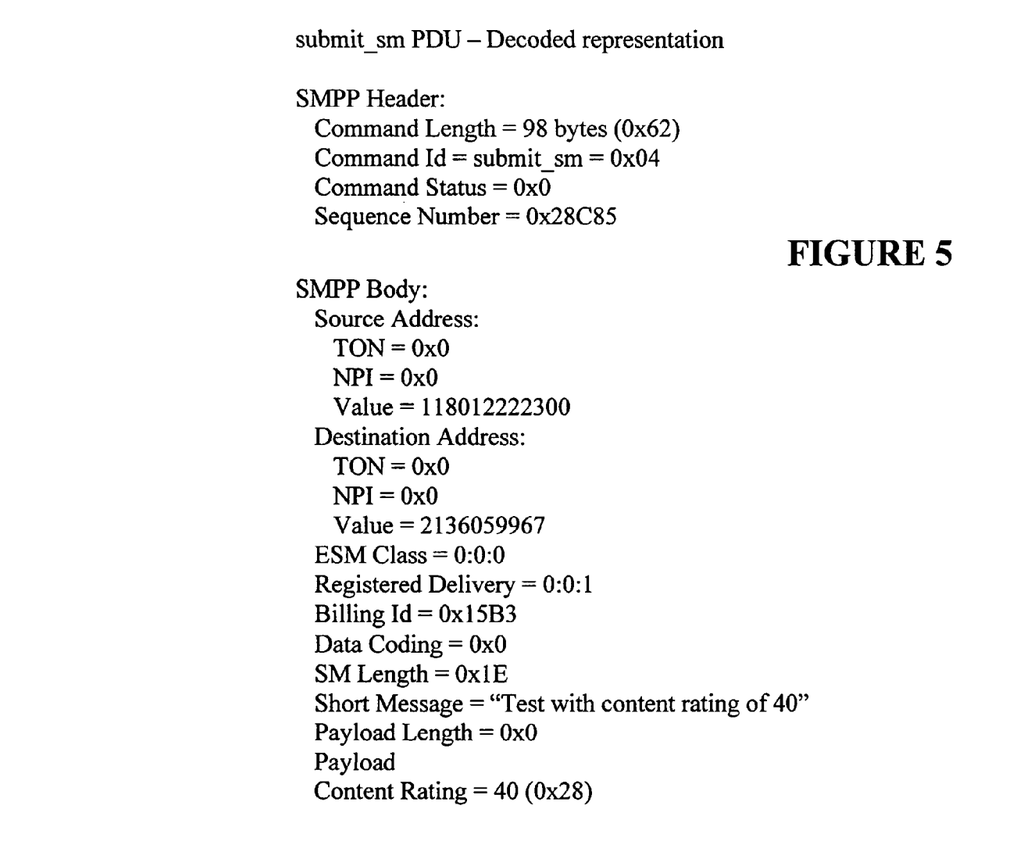
FIG. 5 illustrates the example of a message from FIG. 4, in decoded representation.

FIG. 5 illustrates the example of a message from FIG. 4, in decoded representation. Specifically, FIG. 5 identifies header and body information from the hexadecimal representation in FIG. 4.

Figure 6:
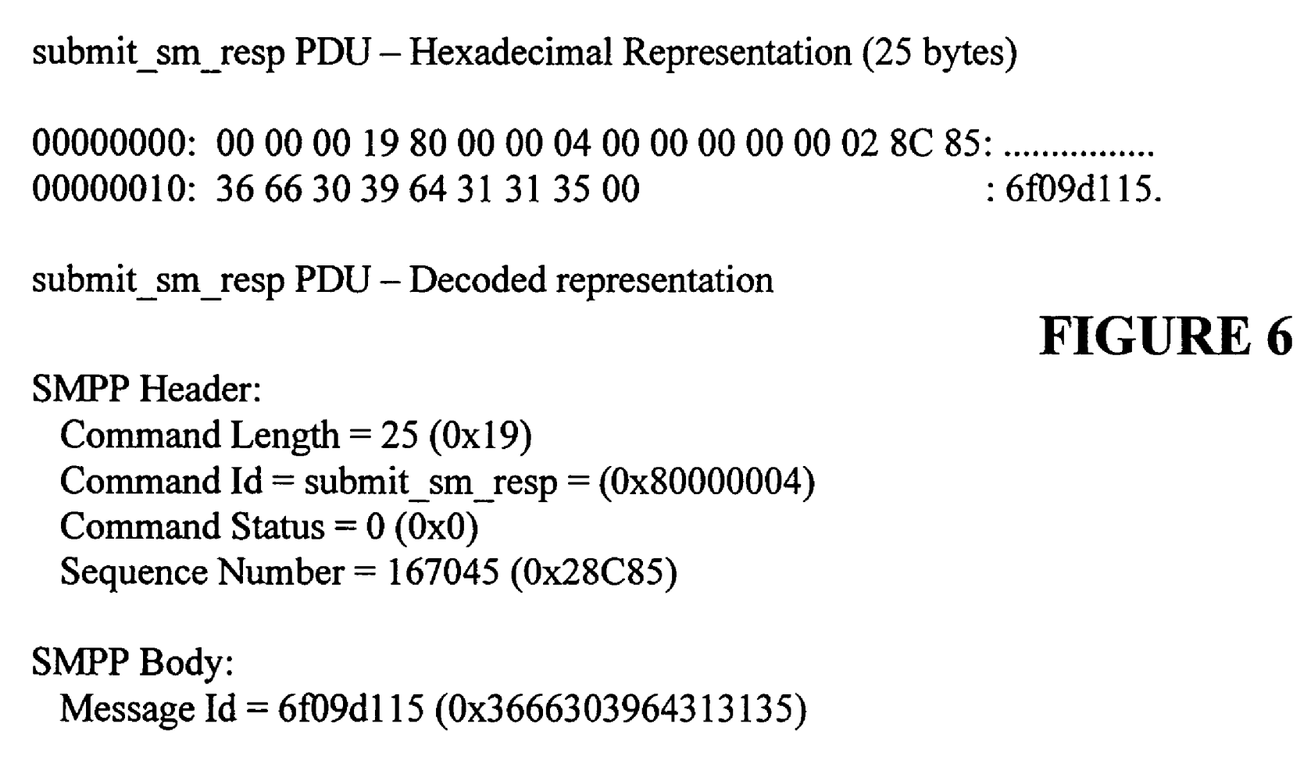
FIG. 6 illustrates an example of an error message, in hexadecimal representation and in decoded representation.

FIG. 6 illustrates an example of an error message, in hexadecimal representation and in decoded representation. This error message may be sent from MC 260 to SMPP Gateway 280 during step S5 of FIG. 2 to indicate that the SMS message was blocked by MC 260.

A different (but similar) error message may be sent during step S10 of FIG. 3 to indicate that the SMS message was approved by MC 360.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. For example, although SMS communications have been discussed above and illustrated in the drawings, similar content management procedures may be applied to MMS communications.

It is intended by the following claims to claim any and all applications, modifications and variations that fall within the true scope of the present teachings.

What is claimed is:

1. A method for managing short message service (SMS) message content within a wireless network, comprising steps of:
   receiving a first SMS message from a mobile station at a message center (MC) of the wireless network, wherein the first short message requests content and comprises: a short code and an identification of the mobile station;
   based on the short code, sending the first SMS message as a Short Message Peer-to-Peer Protocol (SMPP) message through a gateway to an External Short Messaging Entity (ESME);
   receiving a SMPP message as a response from the ESME at the MC via the gateway, wherein the received SMPP response message comprises: content, the short code, a content rating for evaluating the content in the received SMPP response message, and the mobile station identification;
   determining a subscriber rating associated with the mobile station identification;
   comparing the subscriber rating with the content rating; and
   determining, based upon the comparison of the subscriber rating with the content rating, whether or not to deliver a second short message containing the received content, from the MC to the mobile station, through the wireless network.

2. The method of claim 1, further comprising:
   upon determining not to deliver the second short message to the mobile station, blocking delivery of the second short message to the mobile station.

3. The method of claim 2, further comprising:
   sending a SMPP message to the ESME via the Gateway indicating that the delivery of the second short message to the mobile station was blocked.

4. The method of claim 1, further comprising:
   upon determining to deliver the second short message to the mobile station, sending the second short message to the mobile station through the through the wireless network.

5. The method of claim 4, further comprising:
   sending a SMPP message to the ESME via the Gateway indicating that a determination to approve delivery of the second short message to the mobile station occurred.

6. The method of claim 1, wherein the content rating is a rating determined by the ESME.

7. The method of claim 1, wherein the content rating is a rating determined by the gateway responsive to the short code.

8. The method of claim 1, wherein the content rating is contained in a Tag Length Variable (TLV) field of the received SMPP response message.

9. A Messaging Center for managing short message service (SMS) message content within a wireless network, comprising:
   a storage device for storing SMS messages; and
   a processor,
   wherein the processor is configured to cause the Messaging Center to perform functions, comprising functions to:
   receive a first SMS message from a mobile station, wherein the first short message requests content and comprises: a short code, and an identification of the mobile station;
   send the first SMS message as a Short Message Peer-to-Peer Protocol (SMPP) message through a gateway, to an External Short Messaging Entity (ESME), based on the short code;
   receive a SMPP message as a response from the ESME via the gateway, wherein the received SMPP response message comprises: content, the short code, a content rating for evaluating the content in the received SMPP response message, and the mobile station identification;
   determine a subscriber rating associated with the mobile station identification;
   compare the subscriber rating with the content rating; and
   determine, based upon the comparison of the subscriber rating with the content rating, whether or not to deliver a second short message containing the received content, to the mobile station through the wireless network.

10. The Messaging Center of claim 9, wherein the Messaging Center is a Short Message Service Center (SMSC).

* * * * *